UNITED STATES PATENT OFFICE.

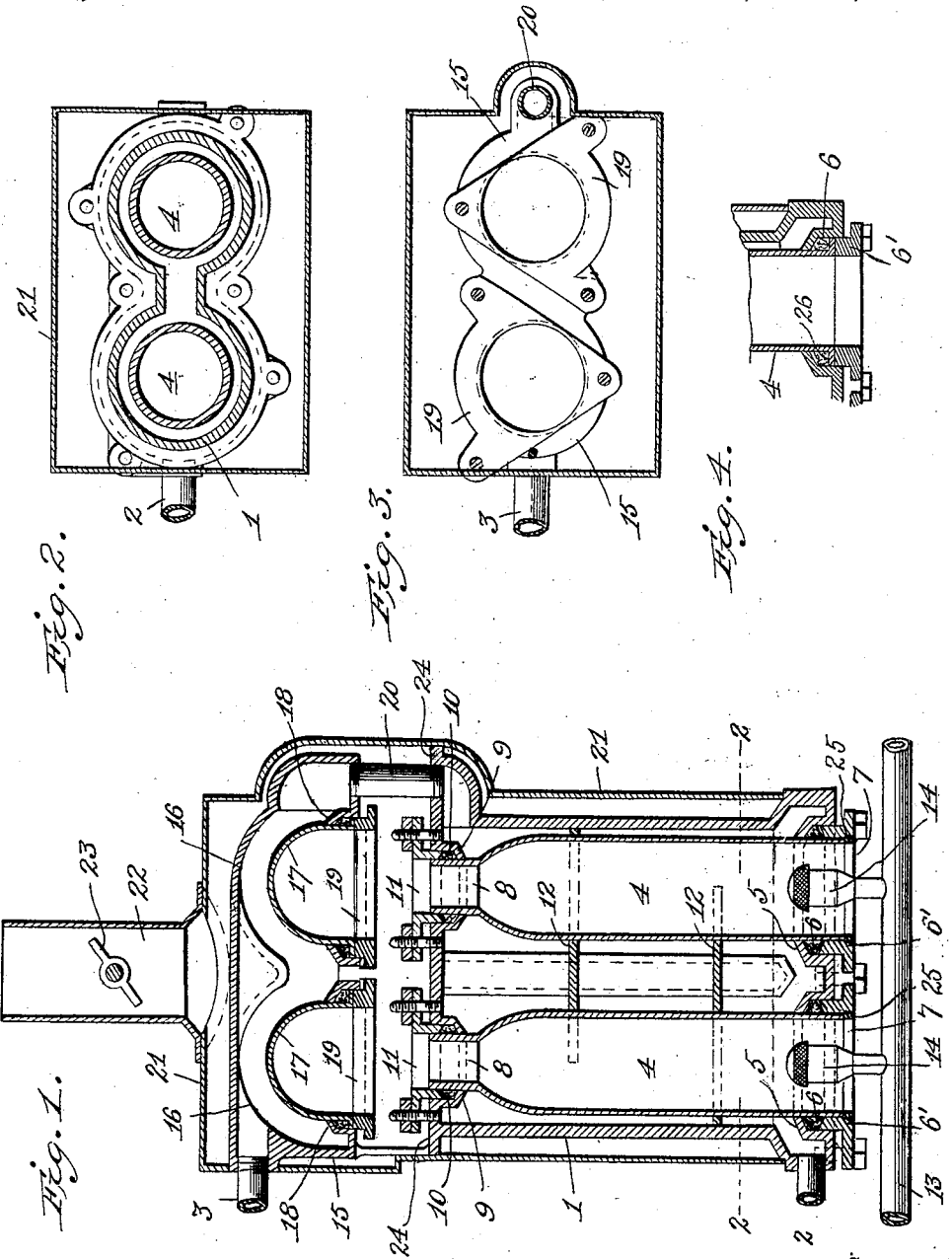

JESSE T. BURR, OF CLEVELAND, OHIO.

HEATER.

No. 912,069.   Specification of Letters Patent.   Patented Feb. 9, 1909.

Application filed March 6, 1907. Serial No. 360,875.

*To all whom it may concern:*

Be it known that I, JESSE T. BURR, a citizen of the United States, residing at Cleveland, in the county of Cuyahoga, State of Ohio, have invented new and useful Improvements in Heaters, of which the following is a specification.

My invention relates to steam generating or water or air heating devices, and has for its objects certain improvements in the construction of the same, as will be hereinafter more definitely pointed out and claimed, reference being had to the accompanying drawing, in which:

Figure 1 is a vertical longitudinal sectional view of a steam generator or water heater embodying my improved construction. Fig. 2 is a horizontal sectional view taken on the line 2—2, Fig. 1. Fig. 3 is a bottom plan view of the superheater. Fig. 4 is a detail sectional view of the lower end of one of the heating tubes, illustrating a slightly modified construction.

Similar numerals of reference denote corresponding parts in the several views.

In the said drawing the reference numeral 1 denotes a casing, formed of any suitable metal, and provided with a water inlet 2 and water outlet 3. Located within the casing is a plurality of heating tubes 4, the lower open ends of which pass freely through interior stuffing boxes 5 formed in the bottom of the casing 1, said tubes and the packing 6 of said stuffing boxes being retained in position by retaining plates 6' apertured at 7 to correspond with the open ends of said tubes. Said heating tubes 4 are contracted at their upper ends 8, as shown, said contracted ends sliding freely in stuffing boxes 9 formed within the upper end of the casing 1, the packing 10 thereof being retained in position by rings 11 bolted to the casing. By this construction both ends of the tubes 4 are free to move vertically in their respective stuffing boxes, due to expansion or contraction, while leakage, even under excessive differences in temperature between said tubes and the casing 1, is effectually prevented.

Within the casing 1 I locate a series of horizontal partitions 12, open at alternate ends, for causing the water admitted at 2 to follow a tortuous path through said casing. Beneath the lower open ends of the heating tubes 4 I locate preferably a gas supply pipe 13 having burners 14, one for each heating tube, though any suitable form of heating medium, and any suitable means for supplying the same, may be employed.

By referring to the several figures of the drawing it will be observed that the water space between the walls of the casing 1 and heating tubes remains the same throughout except at the points lying between the heating tubes 4, where it is of double width, to accommodate the volume of water passing around both sides of said heating tubes. This space may be very narrow, *i. e.*, one-sixteenth of an inch, if desired, and I thereby obtain sheets of water passing around the heating tubes 4 in thin ribbons or films, which are thus exposed to the action of the heat in said heating tubes in a manner adapted to obtain a maximum of heating effect.

By forming the heating tubes with their body portions of even diameter, as shown, and then contracting them at their upper ends to, say, one-third their diameters, I provide a sufficient draft for the products of combustion, and yet prevent the too rapid escape of the same.

In order that the full heating effect of the products of combustion may be obtained, I locate over the casing a superheater, the same consisting of a top plate 15 formed into rounded projections 16, and receiving a series of similarly rounded base plates 17, said base plates being received in stuffing boxes 18 formed interiorly in the superheater, and being retained in position by suitable apertured retaining plates 19 bolted to the underside of said superheater, said stuffing boxes permitting a vertical movement to the base plates 17 due to variations in temperature. Said superheater is connected to the casing 1 by means of a pipe 20, and the space between the projections 16 and plates 17 is just sufficient to accommodate the flow of water from the casing 1.

The superheater is so positioned over the casing 1 that the concaved surfaces of the base plates 17 thereof each register centrally with the discharge end of one of the heating tubes 4, so that the products of combustion discharging from the latter impinge against said base plates, thereby still further heating the fluid passing through the superheater, and then escape laterally around the lower edges of said superheater.

Surrounding the superheater is a jacket 21 that confines the products of combustion as they escape from beneath the superheater and cause the same to act on the entire outer surface of said superheater, a flue 22 provided with a damper 23 being located on said jacket to control the draft. If desired, the jacket 21 may be extended down to inclose the casing 1, as shown, a partition 24 separating said jacket into two chambers. That portion of the jacket surrounding the casing 1 may either form a dead air space, or may be packed with any suitable non-conductor of heat, such as asbestos.

By locating the stuffing boxes 5, 9 and 18 within the water space of the casing 1 and within the water space of the superheater I effectually protect the same from the direct action of the heat, the same being thus surrounded by either water or steam, which are necessarily at a lower temperature than that of the products of combustion. By retaining both ends of the tubes 4, as well as the base plates 17 of the superheater, in stuffing boxes I provide a thoroughly water and steam-tight connection and at the same time obviate all danger of broken joints, due to excessive heat. If desired, the annular portions of the retaining plates 6' underlying the lower ends of the heating tubes 4 may be formed into separate rings 25, screwed into position in the plates 6', as shown in Fig. 1, whereby said heating tubes 4 may be removed without disturbing the packings 6, by simply unscrewing said rings 25.

In Fig. 4 I have illustrated a slightly modified construction of the lower ends of the heating tubes 4, the same being flanged at 26 to form the retaining means for the packing 6, the plate 6' serving to retain said tube in position.

As thus described and shown the device is particularly well adapted for the rapid production of steam or hot water, as desired, but it will be apparent that said device is equally well adapted for use as a radiator for heating air. When so used, gas supply pipe 13 and burners 14 are preferably dispensed with, and hot water or steam admitted through the pipe 3, which thus becomes the supply pipe. Currents of air induced by the heat of the water or steam pass up through the burner tubes 4, which thus become air heating tubes, and, by reason of the described construction of the steam or water passage between the tubes 4 and casing 1, the heat from the water or steam supply is rapidly extracted.

If desired, instead of admitting the water or steam at 3, the device may be reversed by turning it upside down, when the inlet 2 will remain the water or steam inlet. Should any clogging of the device occur, due to impurities in the water and the narrow water passages, the burner tubes 4 may be readily removed by any unskilled person by simply removing their retaining plates 6, and the same is also true of the base plates 17 in the superheater. When used as a radiator fresh air from the exterior of the building may be heated and discharged from the device by connecting the lower ends of the tubes 4 with piping leading to the exterior of the building, as will be readily understood.

I do not desire to limit myself to the particular arrangement of casing and heating tubes, as the same may be arranged in circular form instead of in a right line, provided the essential feature of narrow uniform passages for the water be preserved.

By employing the jacket 21 surrounding the superheater, and the flue 22 and damper 23 therefor, I am enabled to accurately control the draft through the tubes 4, thus dispensing with the use of separate adjustable air openings and valves at the bottom of said tubes.

Having thus described my invention, what I claim as new and desire to secure by Letters Patent is:

1. A heater or radiator, embodying an inclosing casing, a series of open ended tubes located therein, means for admitting, circulating and withdrawing a fluid supply between said casing and tubes, means for supplying a medium to said tubes, and a superheater located above the discharge ends of said tubes and connected with said casing to permit the flow of the fluid supply therebetween, said casing and tubes being of substantially the same configuration to provide a uniform narrow fluid circulating space, and said superheater having a similar fluid passage.

2. In combination with a fire tube heater, a superheater located above the same and receiving the fluid discharge from said heater, and formed into a series of rounded projections, one for each fire tube, each receiving against its under concaved surface the discharge from one of the fire tubes.

3. In combination with a fire tube heater, a superheater located above the same and receiving the fluid discharge from said heater, and formed into a series of rounded projections, one for each fire tube, each receiving against its under concaved surface the discharge from one of the fire tubes, and a jacket conforming to the outer configuration of said superheater and surrounding but spaced apart from the same, whereby the products of combustion will act on the entire outer surface of said superheater.

4. In combination with a fire tube heater, a superheater located above the same and receiving the fluid discharge from said heater, and formed into a series of rounded projections, one for each fire tube, each receiving against its under concaved surface the discharge from one of the fire tubes, said superheater being formed to provide a narrow substantially uniform fluid passage therethrough.

5. In combination with a fire tube heater, a superheater located above the same and receiving the fluid discharge from said heater, and embodying a top plate formed into a series of rounded projections, one for each fire tube, and a series of similarly rounded removable base plates, each receiving against its under concaved surface the discharge from one of the fire tubes, said top plate and base plates being relatively positioned to leave a narrow substantially uniform fluid passage therebetween.

6. In a heater, an inclosing casing, a series of tubes therein, stuffing boxes receiving the lower ends of said tubes, retaining plates for said tubes forming part of said stuffing boxes, and separately removable rings forming part of said retaining plates that engage said tubes to retain the same in position.

In testimony whereof, I have hereunto set my hand in the presence of two subscribing witnesses.

JESSE T. BURR.

Witnesses:
FRANCIS S. MAGUIRE,
PERCY B. HILLS.